(12) United States Patent
Lees et al.

(10) Patent No.: US 11,340,853 B2
(45) Date of Patent: May 24, 2022

(54) APPLIANCE HANDLE WITH AUTOMATIC SHUTOFF OF INPUT INTERFACE ELEMENTS

(71) Applicant: Anova Applied Electronics, Inc., San Francisco, CA (US)

(72) Inventors: Harrison John Lees, San Franciso, CA (US); Matthew Erwin Hilt, Port Washington, NY (US)

(73) Assignee: Anova Applied Electronics, Inc., San Francisco, CA (US)

( * ) Notice: Subject to any disclaimer, the term of this patent is extended or adjusted under 35 U.S.C. 154(b) by 0 days.

(21) Appl. No.: 16/837,363

(22) Filed: Apr. 1, 2020

(65) Prior Publication Data

US 2021/0311681 A1    Oct. 7, 2021

(51) Int. Cl.
*G06F 3/14* (2006.01)
*G06F 3/044* (2006.01)

(52) U.S. Cl.
CPC ............... *G06F 3/14* (2013.01); *G06F 3/044* (2013.01)

(58) Field of Classification Search
CPC ..... G09F 9/33; G09F 9/30; G09F 9/35; G09F 9/301; H01L 27/32; H01L 33/00; H01L 33/62; H01L 51/56; G06F 3/14
See application file for complete search history.

(56) References Cited

U.S. PATENT DOCUMENTS

| | | | |
|---|---|---|---|
| 4,255,640 A | 3/1981 | Bressler | |
| 5,132,503 A | 7/1992 | Lee | |
| 6,300,609 B1 | 10/2001 | Kim | |
| 6,672,867 B1 | 1/2004 | Du | |
| 7,082,777 B2 | 8/2006 | Becke et al. | |
| 7,308,186 B2 | 12/2007 | Kaczmarek | |
| 7,554,058 B2 | 6/2009 | Stahl et al. | |
| 7,766,525 B2 | 8/2010 | Rosenbauer et al. | |
| 8,003,923 B2 | 8/2011 | Wilsdorf | |
| 8,081,085 B2 | 12/2011 | Jerg et al. | |
| 8,556,439 B2 | 10/2013 | Eng et al. | |
| 8,810,423 B2 | 8/2014 | Kaczmarek et al. | |
| 9,005,372 B2 | 4/2015 | Lolsberg | |

(Continued)

FOREIGN PATENT DOCUMENTS

| | | |
|---|---|---|
| CN | 102327069 A | 1/2012 |
| CN | 202419736 U | 9/2012 |

(Continued)

OTHER PUBLICATIONS

International Search Report and Written Opinion for International Application No. PCT/US2021/024626, dated Jun. 23, 2021, 19 pages.

*Primary Examiner* — Olga V Merkoulova
(74) *Attorney, Agent, or Firm* — RatnerPrestia

(57) ABSTRACT

An appliance having a cabinet, a door connected to the cabinet and movable in an opening direction from a closed position to an open position, and a handle connected to the door. The handle has a first side facing against the opening direction and forming a grasping surface, a second side facing along the opening direction, and an interface region having one or more input interfaces on the second side of the handle. The appliance has one or more shutoff sensors configured to disable at least one of the one or more input interfaces on the interface region when an object is detected adjacent the grasping surface.

21 Claims, 4 Drawing Sheets

(56) References Cited

U.S. PATENT DOCUMENTS

| | | | |
|---|---|---|---|
| 9,161,675 B2 | 10/2015 | Eng et al. | |
| 9,365,967 B2 | 6/2016 | Hering et al. | |
| 9,607,489 B2 | 3/2017 | Roberson et al. | |
| 9,685,731 B2 | 6/2017 | Chonan | |
| 9,709,283 B2 | 7/2017 | Eriksson et al. | |
| 9,745,788 B2 * | 8/2017 | Becker | G01R 27/2605 |
| 9,791,936 B1 * | 10/2017 | Kovach | G09G 5/12 |
| 10,036,181 B2 * | 7/2018 | Viswanathan | H05B 6/6414 |
| D848,196 S * | 5/2019 | Dash | D7/328 |
| 10,281,156 B2 | 5/2019 | Raghavan et al. | |
| 10,317,090 B2 | 6/2019 | Hildner et al. | |
| 10,674,569 B2 * | 6/2020 | Luckhardt | G06T 7/55 |
| 11,006,812 B2 * | 5/2021 | Ford, Jr. | E05B 1/0015 |
| 2002/0135476 A1 * | 9/2002 | McKinney, Jr. | H05B 47/13 340/540 |
| 2006/0080994 A1 * | 4/2006 | Seiden | F25D 11/02 62/441 |
| 2007/0144562 A1 | 6/2007 | Classen et al. | |
| 2008/0236563 A1 * | 10/2008 | Wilsdorf | A47L 15/4257 126/273 R |
| 2010/0145483 A1 | 6/2010 | McGonagle et al. | |
| 2012/0111366 A1 * | 5/2012 | Baldwin | A47L 15/4293 134/18 |
| 2016/0186984 A1 | 6/2016 | Giacomini et al. | |
| 2017/0086261 A1 | 3/2017 | Zhou | |
| 2017/0086262 A1 | 3/2017 | Zhou | |
| 2017/0099988 A1 | 4/2017 | Matloubian et al. | |
| 2017/0122568 A1 | 5/2017 | Ivanovic et al. | |
| 2017/0163438 A1 | 6/2017 | Gary et al. | |
| 2017/0231058 A1 * | 8/2017 | Sadwick | H05B 45/22 |
| 2017/0280515 A1 | 9/2017 | Imai et al. | |
| 2017/0328577 A1 | 11/2017 | Reinhard-Herrscher et al. | |
| 2018/0216830 A1 * | 8/2018 | Ivanovic | F25D 29/005 |
| 2018/0266697 A1 * | 9/2018 | Dash | F24C 15/04 |
| 2018/0325312 A1 | 11/2018 | Moon et al. | |
| 2019/0008006 A1 * | 1/2019 | Lee | F24C 15/022 |
| 2021/0311681 A1 * | 10/2021 | Lees | G06F 3/14 |

FOREIGN PATENT DOCUMENTS

| | | |
|---|---|---|
| DE | 102008041519 A1 | 3/2010 |
| DE | 102009001551 A1 | 9/2010 |
| EP | 1833348 A1 | 9/2007 |
| EP | 2189727 A1 | 5/2010 |
| WO | 9726486 A1 | 7/1997 |
| WO | 2014101930 A1 | 7/2014 |
| WO | 2017211380 A1 | 12/2017 |
| WO | 2019197596 A1 | 10/2019 |

* cited by examiner

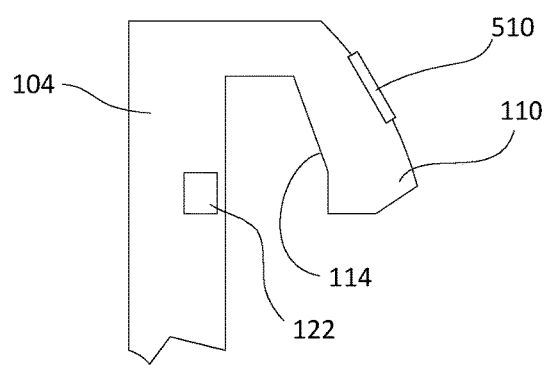
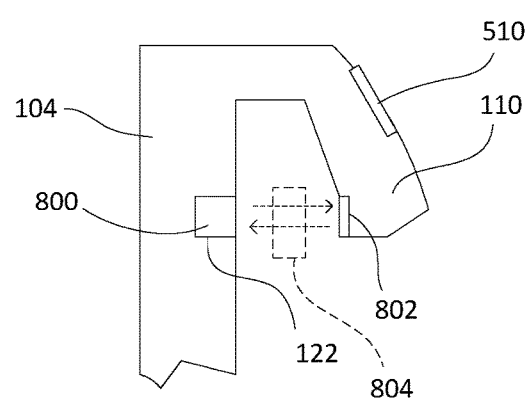
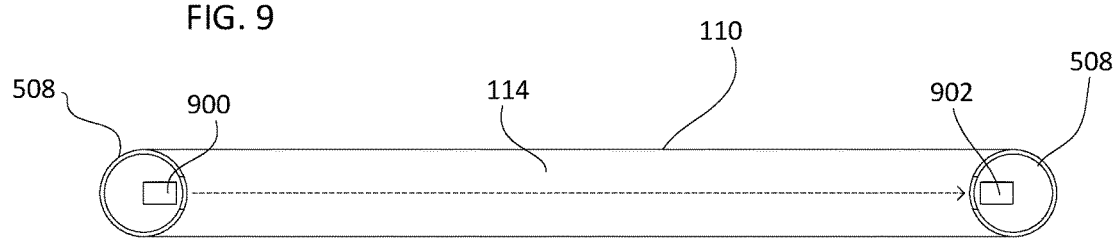
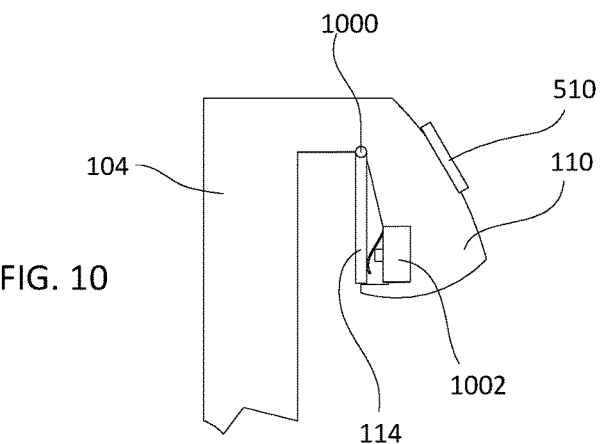

APPLIANCE HANDLE WITH AUTOMATIC SHUTOFF OF INPUT INTERFACE ELEMENTS

BACKGROUND

Consumer appliances such as ovens, dishwashers, refrigerators, and the like typically include doors to enclose internal chambers. Such doors typically include some kind of handle or grip to allow the door to be easily operated by the user. In some cases, the handle might include additional functional features, such as lights for illuminating the appliance, displays to show time or operating status, and input mechanisms that can be used to operate or program the appliance.

An example of an appliance having a door handle with input and output interfaces is described in U.S. Publication No. 2018/0216830, which is incorporated herein by reference. This publication describes a cooking oven having an LED (light emitting diode) display or indicator on the front side of the door handle. This publication also suggests that the handle can include a touch sensor or a touch dimmer.

Another example of an appliance having a door handle with input and output interfaces is described in U.S. Publication No. 2018/0325312, which is incorporated herein by reference. This publication describes a double-sided grill having a handle to open and close the grill elements, and an input/output interface on the handle.

Other appliances having input and/or output interfaces in the handle are shown in Chinese Application Nos. CN102327069A and CN202419736U, and WO97/26486, which are all incorporated herein by reference.

The inventors have determined that the state of the art of appliance handle interfaces can be improved.

SUMMARY

In a first exemplary aspect, there is provided an appliance having a cabinet, a door connected to the cabinet and movable in an opening direction from a closed position to an open position, and a handle connected to the door. The handle has a first side facing against the opening direction and forming a grasping surface, a second side facing along the opening direction, and an interface region having one or more input interfaces on the second side of the handle. The appliance has one or more shutoff sensors configured to disable at least one of the one or more input interfaces on the interface region when an object is detected adjacent the grasping surface.

In some exemplary embodiments, at least one of the one or more shutoff sensors comprises one or more capacitive proximity sensors.

In some exemplary embodiments, at least one of the one or more shutoff sensors comprises one or more capacitive touch sensors.

In some exemplary embodiments, at least one of the one or more shutoff sensors comprises one or more optical sensors.

In some exemplary embodiments, at least one of the one or more shutoff sensors comprises one or more mechanical switches.

In some exemplary embodiments, the one or more shutoff sensors are configured to disable all of the one or more input interfaces on the interface region when the object is detected adjacent the grasping surface.

In some exemplary embodiments, the one of the one or more shutoff sensors are configured to disable at least one of the one or more input interfaces on the interface region when the object is detected in contact with the grasping surface.

In some exemplary embodiments, the one or more shutoff sensors are configured to disable at least one of the one or more input interfaces on the interface region when the object is detected in proximity to the grasping surface.

In some exemplary embodiments, the handle comprises a housing attached to the door, a cover attached to the housing and comprising at least a portion of the interface region, and a printed circuit board contained by the housing and the cover. The printed circuit board may have a first side facing the cover and a second side facing opposite the cover, and at least one of the one or more input interfaces may be mounted on the first side of the printed circuit board, and at least one of the one or more shutoff sensors may be mounted on the second side of the printed circuit board. The one or more shutoff sensors may be completely enclosed within the housing and cover. The handle may also include a display trim located between the first side of the printed circuit board and the cover, the display trim comprising a plurality of openings, each opening configured to surround one of more input interfaces or output interfaces.

In some exemplary embodiments, the one or more shutoff sensors are mounted on the handle.

In some exemplary embodiments, the one or more shutoff sensors are mounted on the door.

In some exemplary embodiments, the one or more shutoff sensors are configured to disable the at least one of the one or more input interfaces when an object is detected adjacent a predetermined region of the grasping surface.

In some exemplary embodiments, the one or more shutoff sensors are configured to disable the at least one of the one or more input interfaces when an object is detected adjacent any portion of the grasping surface.

In some exemplary embodiments, the door is movably mounted to the cabinet by a pivot, and the opening direction comprises an arcuate path centered on a rotation axis of the pivot.

In some exemplary embodiments, the door is movably mounted to the cabinet by one or more sliders, and the opening direction comprises a linear path parallel to a travel path of the one or more sliders.

In some exemplary embodiments, the handle is elongated in a longitudinal direction, and is connected to the door at longitudinal ends of the handle.

In some exemplary embodiments, the handle is formed by a pocket or groove in the door.

In some exemplary embodiments, the handle is formed by a portion of the door that extends beyond a perimeter of the cabinet.

BRIEF DESCRIPTION OF THE DRAWINGS

Examples of various inventions described herein are illustrated in the following drawings, in which like reference numbers refer to like parts.

FIG. 7 is a partial side view of another embodiment of an appliance door and handle having an alternative shutoff sensor.

FIG. 8 is a partial side view of another embodiment of an appliance door and handle having another alternative shutoff sensor.

FIG. 9 is a rear side view of another embodiment of an appliance handle having another alternative shutoff sensor.

FIG. 10 is a partial side view of another embodiment of an appliance door and handle having another alternative shutoff sensor.

DETAILED DESCRIPTION OF EXEMPLARY EMBODIMENTS OF THE INVENTION

The inventors have determined that existing appliance handle interfaces can have limitations. For example, when input interfaces are provided across a large area of the handle, it may be difficult to grasp the handle to open the door without accidentally activating one or more inputs. This can lead to improper appliance operation, and user frustration. These problems are exasperated by the use of modern touch inputs, which require only a slight contact to activate an input. Such problems can be mitigated by isolating the input features into a distinct region (e.g., a discrete part of the handle having input buttons), while leaving other portions of the handle available to grasp without concern for accidentally touching the inputs, but this limits the available space for providing inputs. Such problems can also be mitigated by generating an audible signal to indicate when a setting has been changed, but the operator might not notice or pay attention to the audible signal, and might still have difficultly determining which setting was changed. Thus, such solutions have their own associated shortcomings.

The inventors have determined that a more favorable solution to addressing accidental inputs during operation of a control handle is to disable one or more of the input interfaces when an operator is using the handle to open the door, and more particularly when a user has positioned their hand in preparation for opening the door by reaching behind and grasping the handle. Examples of such solutions are described in detail below.

Figure 1:
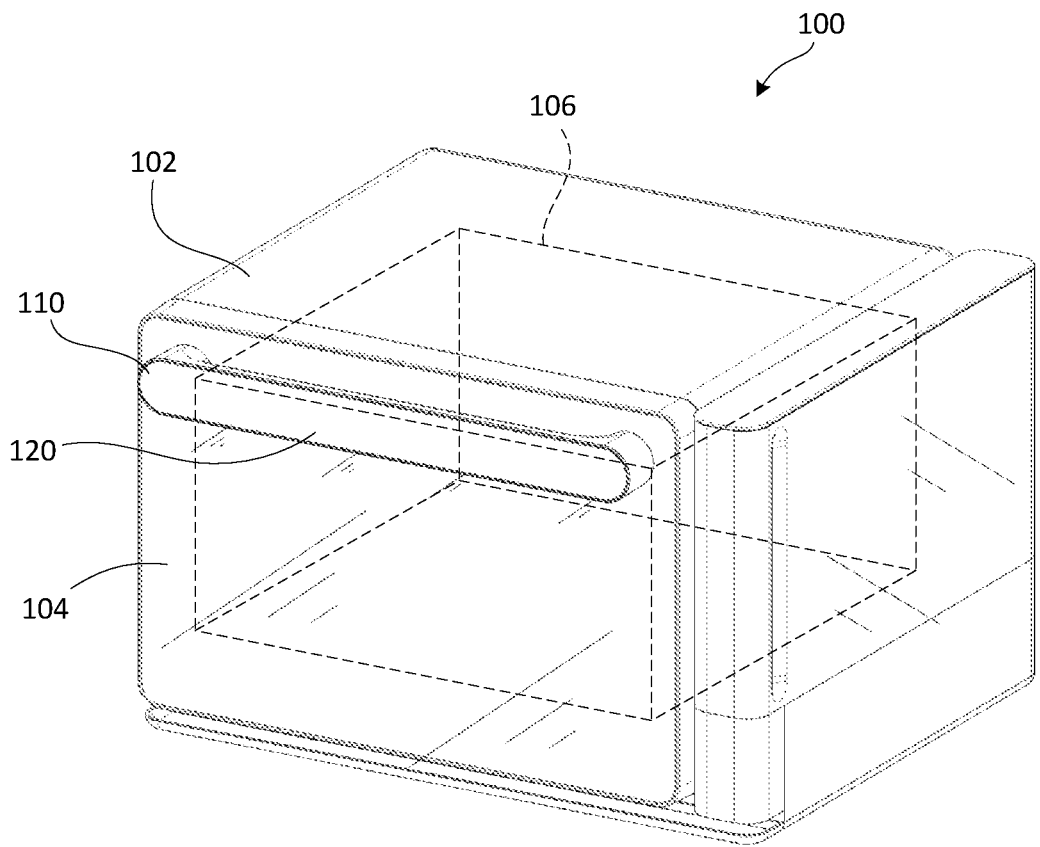
FIG. 1 is an isometric view of an appliance having a shutoff sensor.
Figure 2:
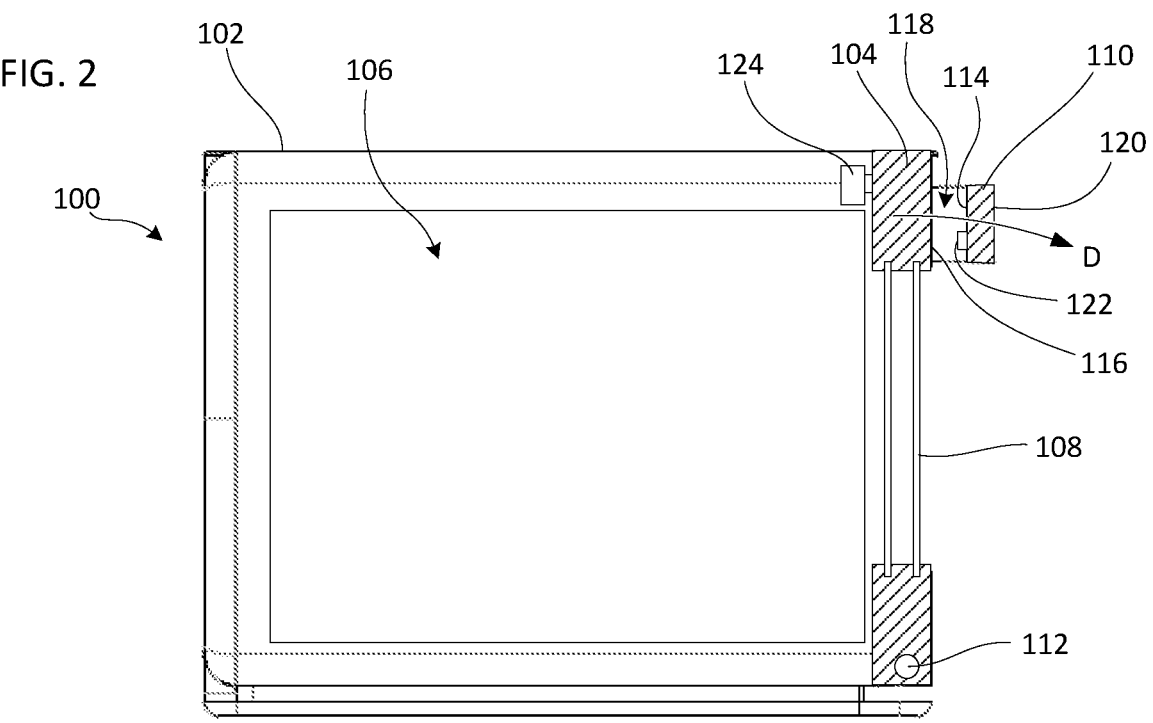
FIG. 2 is a partially cut away side view of the appliance of FIG. 1.

FIGS. 1 and 2 illustrate an example of an appliance 100 in the form of an oven (e.g., steam, convection, microwave, etc.). In this case, the appliance 100 is a movable tabletop unit, but it could be configured as a built-in unit. The appliance has a cabinet 102 with a door 104 attached to the cabinet 102 by hinges, sliders, or the like. The door 104 is movable between a closed position (shown), in which it covers an internal chamber 106 (in this case, a cooking chamber), and an open position in which the door 104 opens the chamber 106 for user access. The door 104 may be opaque, or it may include one or more transparent panes 108 to allow viewing inside the chamber 106.

The door 104 includes a handle 110 that is positioned to enable the operator to move the door 104 from the closed position to the open position. In this case, the door 104 is mounted on a horizontal pivot 112 that extends along the bottom of the door 104, such that pulling on the handle 110 causes the door 104 to move in an opening direction D defined by an arc having its center at the pivot 112. For doors having pivot mounts, the opening direction D will generally be an arcuate path centered on the axis (usually vertical or horizontal) of the pivot, while doors having sliding mounts will have an opening direction D along a linear path. To facilitate movement in the opening direction D, the handle 110 has a grasping surface 114 that faces against the opening direction D. Some or all of the grasping surface 114 may face directly against the opening direction D, such as by having a planar surface or region that is perpendicular to the opening direction D, but this is not strictly required.

The illustrated exemplary handle 110 is attached to the front face 116 of the door 104, such that the grasping surface 114 is spaced from the front face 116 with a gap 118 formed between the front face 116 and the grasping surface 114. The gap 118 is dimensioned to allow an operator to fit their fingers behind the handle 110 to contact the grasping surface 110. In the example of FIGS. 1 and 2, the handle 110 is connected to the door 104 only at the lateral ends of the handle 110, such that the grasping surface 114 is not connected to the front face 116 along the span of the handle 110. Thus, the gap 118 extends along the entire back side of the handle 110 to allow an operator to reach behind the handle 110 from above or below the handle 110.

Figure 3:
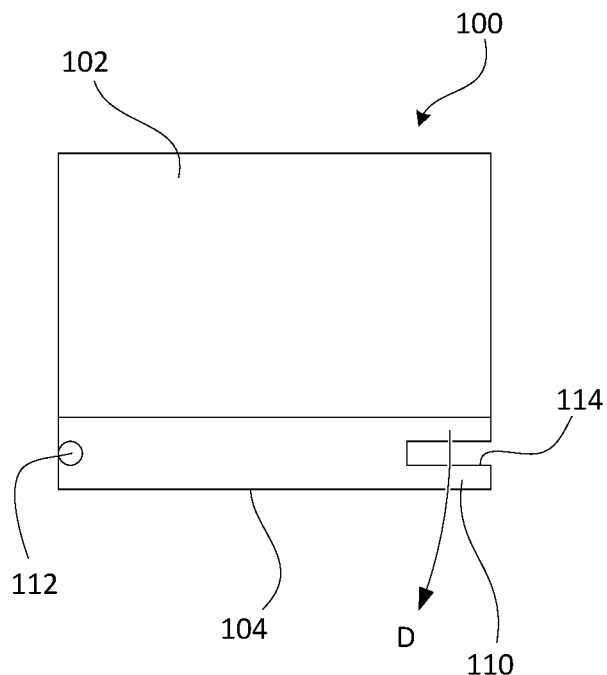
FIG. 3 is a schematic view of an alternative appliance having a different handle configuration.
Figure 4:
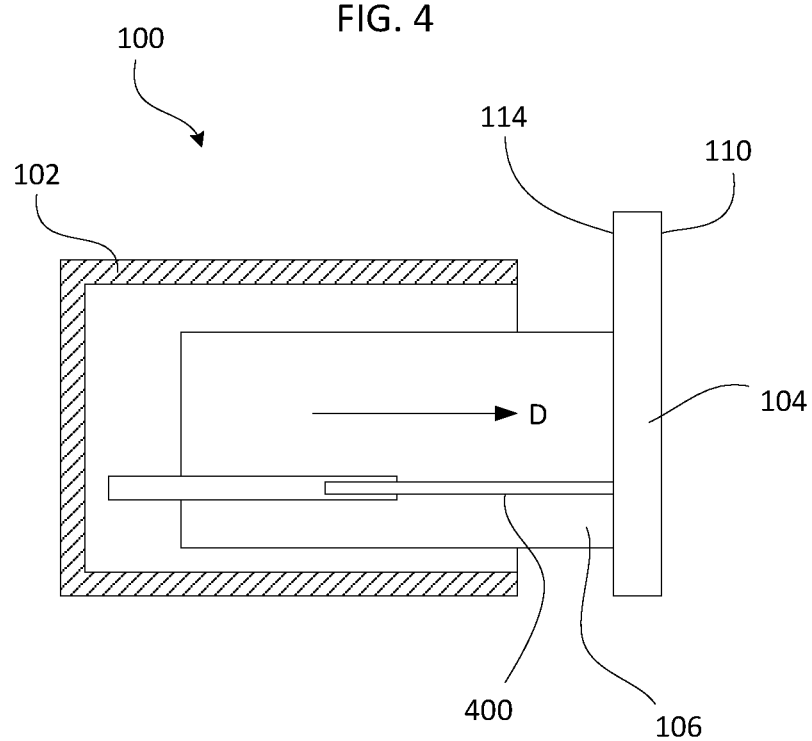
FIG. 4 is a schematic view of an alternative appliance having a different handle configuration.

Other embodiments may use different handle configurations. For example, FIG. 3 schematically shows a top view of an appliance 100 having a door 104 with a handle 110 formed by a groove or pocket 300 in the side of the door 104. The pocket 300 has a grasping surface 114 facing the opening direction D. In this case, the opening direction is an arcuate path about a vertical pivot 112, such that the door 104 opens to the side, rather downward as in FIGS. 1 and 2. FIG. 4 shows a cut away schematic side view of an appliance 100 having a door 104 mounted to a lower portion of the chamber 106. The lower portion of the chamber 106 and the door are mounted to the cabinet 102 by sliders 400. This provides a linear opening direction D. A handle 110 is provided as a vertical extension from the door 110, with the grasping surface 114 on the back side of the extension and facing the opening direction D. In any event, the handle 110 has a first side facing against the opening direction to provide a grasping surface 114. Other alternatives and variations will be apparent to persons of ordinary skill in the art in view of the present disclosure.

Referring back to FIGS. 1 and 2, the handle 110 includes an interface region 120 having one or more input interfaces. The interface region 120 is located on a second side of the handle that faces along the opening direction D. Thus, the interface region 120 is generally opposite the grasping surface 114. An input interface can include any type of mechanism by which the operator can input commands to the appliance 100. Such devices include switches, buttons, dials, sliders, capacitive touch switches or panels, resistive touch switches or panels, optical switches, and the like. The interface region 120 also may include output interfaces, such as LED lights, liquid crystal displays, and other indicators to express the operating settings and conditions of the appliance 100. The interface region 120 also may include other features, such as lights that are configured to illuminate the surroundings or provide decorative accents.

The interface region 120 is located where it can be accessed by the operator in order to use the appliance 100. To this end, the interface region 120 may be located to face along the opening direction D, so that it is directed directly away from the cabinet 102 (such as shown in FIGS. 1 and 2), or at some angle away from the cabinet 102. At least some of the input interfaces may be located on the interface region 120 at locations where the operator's hand can potentially reach when the operator is grasping the handle 110 to open or close the door 104. For example one or more input interfaces may be located on a front side of the handle 110 opposite to the grasping surface 114. However, this leads to the potential problem of accidentally activating one or more input interfaces when the operator grasps the handle 110. To help reduce the likelihood of such accidental contact, one or more shutoff sensors 122 are positioned in a region that the operator's hand will occupy during opening or closing of the door 104, and configured to disable one or more of the input interfaces when a hand is detected.

Figure 5:
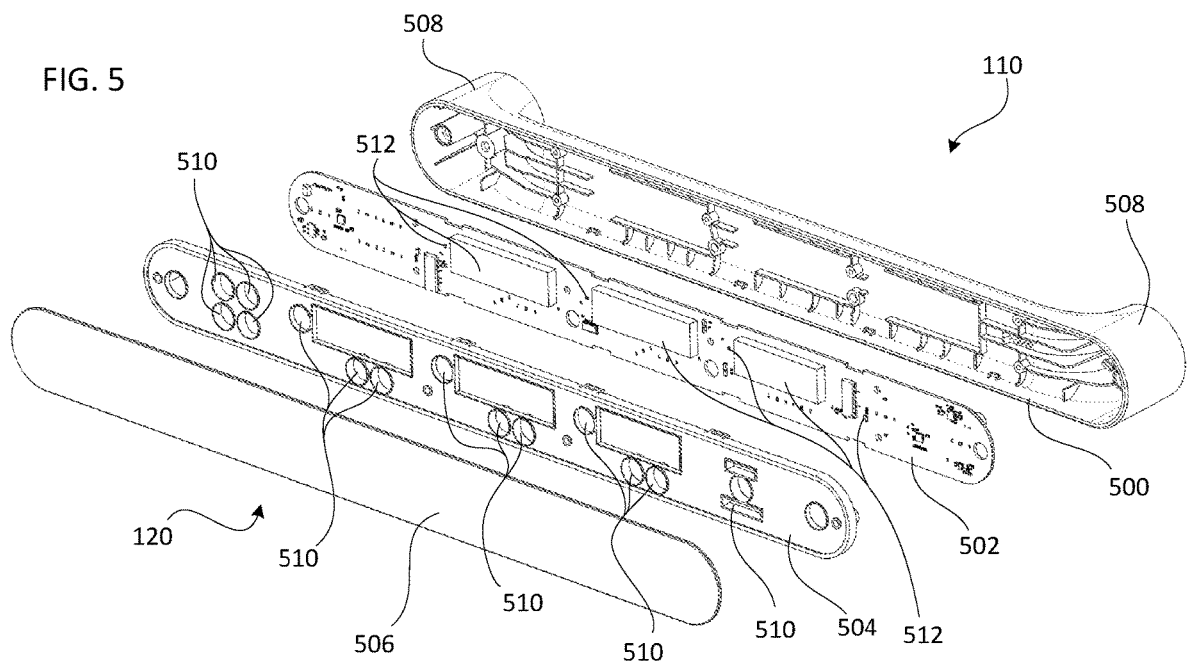
FIG. 5 is an exploded front isometric view of the handle of the appliance of FIG. 1.
Figure 6:
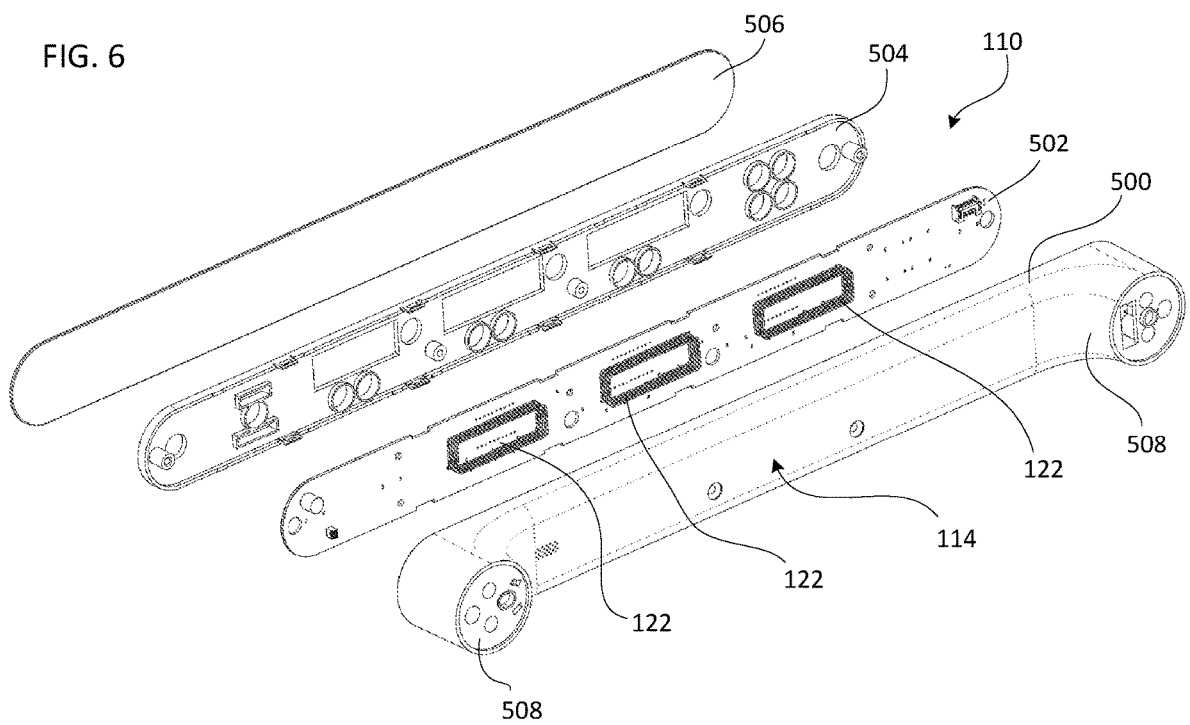
FIG. 6 is an exploded rear isometric view of the handle of the appliance of FIG. 1.

FIGS. 5 and 6 illustrate details of an exemplary handle 110, including exemplary input and output interfaces and shutoff sensors 122 that may be integrated into the handle 110. In this case, the handle 110 comprises a housing 500, a printed circuit board (PCB) 502, a display trim 504 and a display cover 506. The housing 500 is has a mounting post 508 at each end for connecting the handle 110 to the door 104. When so connected, the back side of the handle 110 faces towards the door 104 and provides a grasping surface 114 for pulling the door 104 open, while the interface region 120 faces towards the operator.

The PCB 502 is mounted to the housing 500 and covered by the display trim 506 and the display cover 506. The display trim 506 may comprise one or more parts that are configured to help isolate the different input and output interfaces from each other, such as by providing an opaque bezel surrounding each illuminated display to prevent light from one display being visible at the other display. The display cover 506 seals the assembly to prevent direct contact with the PCB 502, and may comprise one or more transparent or semi-transparent regions to allow viewing of the input and output interfaces. The display cover 506 and/or display trim 504 may be marked with symbols or words to identify the different input and output interfaces. The display cover 506 also may include features to facilitate operation of the input interfaces, such as openings to allow access to toggle switches or dial controls. The display cover 506 also may be configured to permit the use of proximity or touch controls, such as by being formed of a thin plastic, glass or metal material.

In the shown example, the interface region 120 comprises a number of input interfaces 510 located along the length of the handle 110. Similarly, a variety of output interfaces 512 also may be provided along the length of the interface region 120. For example, one or more of the input interfaces 510 might include an underlying LED light to indicate when the operation associated with the input interface 510 is active. The input interfaces 510 and output interfaces 512 are configured to operate and monitor the appliance 100, such as by being wired to a computer processor unit (CPU) that is programmed to receive controls and issue commands to the operating parts of the appliance 100 (e.g., heaters, fans, pumps, etc.) to effectuate operation thereof. The details of such electrical connections and controls are not relevant to the present disclosure, and will be readily understood by persons of ordinary skill in the art. Thus, such details are not described herein.

As noted above, the appliance 100 also includes one or more shutoff sensors 122 that are configured to disable one or more of the input interfaces 510 when a user's hand is detect in proximity with or in contact with the grasping surface 114. The capacitive proximity sensors operate by detecting a change in capacitance between two locations, and more specifically by responding to the change in the dielectric constant within the electromagnetic field between the two locations that is caused by displacing air with the operator's hand. Such devices are known in the art, and available from various sources, such as Allied Electronics & Automation of Fort Worth, Tex.

The shutoff sensors 122 are wired to the electrical control system (e.g., PCB 502 and CPU) to disable operation of one or more of the input interfaces when an operator's hand is detected adjacent to the grasping surface 114. For example, the CPU can be programmed to (a) monitor the shutoff sensors 122 to detect the capacitance value at each shutoff sensor 122, (b) detect a change in capacitance at one or more shutoff sensors 122, (c) determine whether the detected change in capacitance is above a predetermined threshold value, and (d) issue a logical command to disable all input interfaces 510 until the detected change in capacitance drops below the threshold value. The system may be programmed such that activation (i.e., detecting a hand or other object) of a single shutoff sensor 122 disables all of the input interfaces 510, or only a subset of the input interfaces 510. The control system also may be configured to identify the particular shutoff sensor 122 or shutoff sensors 122 that are experiencing the threshold change in capacitance, and only disable input interfaces 510 associated with those shutoff sensors 122. Thus, for example, if an operator grasps one end of the handle 110, only the input interfaces 510 at the grasped end of the handle 110 are disabled.

In the example of FIGS. 5 and 6, the shutoff sensors 122 comprise three capacitive proximity sensors, which are distributed along the length of the handle at a spacing selected to detect the proximity of an operator's hand at any location that is adjacent to the grasping surface 114 and behind one or more of the input interfaces 510. Other embodiments may use different numbers and locations of shutoff sensors 122. For example, if the input interfaces 510 are all located at one end of the handle 110, then the shutoff sensors 122 may be located only at that end of the handle 110 to avoid having shutoff sensor 122 that are not necessary to avoid accidental activation of the input interfaces 510. In other cases, the shutoff sensors 122 may be configured to only disable one or more of the input interfaces 510 when the operator's hand is detected at predetermined locations along the handle 110, such as at locations where incidental contact with the input interfaces 510 is more likely to occur (e.g., directly behind the input interfaces 510). Other alternatives and variations will be apparent to persons of ordinary skill in the art in view of the present disclosure.

Other embodiments may use different types of shutoff sensor 122, or may be programmed to operate according to different control logic. For example, a typical capacitive proximity sensor can be operated as a capacitive touch sensor, by monitoring the sensor to detect an additional change in capacitance caused by physical contact with the sensor or its surroundings (i.e., more than mere proximity). Thus, the shutoff sensors 122 may be configured as contact sensors or as a hybrid of proximity sensors and contact sensors (e.g., disable some inputs upon detecting proximity, and disable other inputs upon detecting contact). In any case, the shutoff sensors 122 are configured to detect when an operator's hand (or potentially other objects) is adjacent to (near or touching) the grasping surface 114.

The control logic of the system also may vary depending on the type of sensor and individual preferences. For example, a capacitive proximity or touch sensor package may be configured with internal control logic that is calibrated to output a simple logical signal (i.e., "on" or "off") upon internally detecting a threshold change in capacitance. Thus, the capacitive proximity or touch sensor may be integrated into the appliance's control system as a simple on/off logical switch, without having to perform capacitive value detection remotely from the switch. In such a case, steps (a) through (c) of the exemplary control logic described above could be replaced by a single step of monitoring for a change in status of the shutoff sensor 122 between "off" (nothing detected) and "on" (an object detected in the region of interest). Other alternatives and variations will be apparent to persons of ordinary skill in the art in view of the present disclosure.

In the example of FIGS. 5 and 6, the shutoff sensors 122 are conveniently packaged into the handle 110 by attaching them to the reverse side of the PCB 502. Thus, when provided as capacitive proximity sensors, the shutoff sensors 122 can be contained within the handle housing 500 without any external exposure, and thereby be protected from the environment. In other examples, such as when a resistive touch sensor or a capacitive touch sensor is used, the shutoff sensors 122 may include electrical contacts that are located on the grasping surface 114 to be directly contacted by the operator's hand. In either event, the handle 110 can be packaged with the PCB 502 being enclosed between the housing 500 and the cover 506, with the input interfaces 510 and output interfaces 512 being mounted to face away from the outward-facing side of the PCB 502, and the shutoff sensors 122 being mounted to face away from the inward-facing side of the PCB 502. This provides a convenient and cost-effective arrangement of the parts.

The shutoff sensors 122 also may be supplemented by conventional door switches 124, such as shown in FIG. 2, that detect whether the door 104 is closed. For example, the control system may have another logical control circuit that disables one or more of the input interfaces 510 when the door switch 124 indicates that the door 104 is open. This would help prevent accidental activation of input interfaces 510 when the handle 110 is pushed to close the door 104. The door switch 124 may comprise a microswitch, capacitive contact sensor, or any other suitable proximity or contact sensor.

FIGS. 7 through 10 illustrate exemplary alternative configurations of shutoff sensors 122.

In FIG. 7, the shutoff sensor 122 comprises a capacitive proximity sensor that is located in the front face of the door 104, to face towards the grasping surface 114 of the handle 110. In this case, one or more input interfaces 510 may be provided on the handle 110 generally opposite to the grasping surface 114.

In FIG. 8, the shutoff sensor 122 comprises an optical switch having a light transmitter/receiver 800 and a retroreflector 802. The transmitter/receiver 800 generates a light beam that strikes the retroreflector 802 and returns to the transmitter/receiver 800. The operator's hand 804 (shown schematically) interrupts the light beam when it is placed behind the handle 110, and the shutoff sensor 122 is configured to disable one or more input interfaces 510 upon detecting the absence of the reflected light beam.

The embodiment of FIG. 9 is similar to that of FIG. 8, but in this case, the shutoff sensor 122 is configured as an optical transmitter 900 located at one lateral end of the handle 110, and an optical receiver 902 located at the other lateral end of the handle 110. The transmitter 900 and receiver 902 may be mounted, for example, inside the mounting posts 508 of the handle 110. Here again, the shutoff sensor 122 is configured to disable one or more input interfaces 510 (not visible in FIG. 9) when the light beam is interrupted by an operator's hand. It will be readily appreciated that the embodiment of FIG. 9 may be modified by using a single optical transmitter/receiver at one end of the handle 110, and a reflector at the other end of the handle 110, and similarly the embodiment of FIG. 8 may be modified by using separate emitters and receivers instead of a single transmitter/receiver and a reflector.

FIG. 10 is an example of a shutoff sensor 122 in the form of a mechanical contact sensor. Here, the grasping surface 114 is mounted to the handle 110 on a movable base, such as a pivot 1000 or a sliding mount, and the shutoff sensor 122 comprises a microswitch 1002 or other position-sensitive switch that is configured to detect when the grasping surface 114 is moved to pull the door 104 open.

Other embodiments may have other configurations. For example, the capacitive proximity sensors of FIGS. 5 and 6 may be replaced by pressure sensors, resistive touch sensors, or the like. In each case, the handle 110 has one or more associated shutoff sensors 122 that are configured to temporarily disable one or more input interfaces 510 (and optionally output interfaces 512) located on the handle 110, when the operator places his or her hand into contact or proximity with the handle's grasping surface 114.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. An appliance comprising:
 a cabinet;
 a door connected to the cabinet and movable in an opening direction from a closed position to an open position;
 a handle connected to the door, the handle having a first side facing against the opening direction and forming a grasping surface, a second side facing along the opening direction, and an interface region having one or more input interfaces on the second side of the handle; and
 one or more shutoff sensors configured to disable at least one of the one or more input interfaces on the interface region upon detecting that an object is between the grasping surface of the handle and the door.

2. The appliance of claim 1, wherein at least one of the one or more shutoff sensors comprises one or more capacitive proximity sensors.

3. The appliance of claim 1, wherein at least one of the one or more shutoff sensors comprises one or more capacitive touch sensors.

4. The appliance of claim 1, wherein at least one of the one or more shutoff sensors comprises one or more optical sensors.

5. The appliance of claim 1, wherein at least one of the one or more shutoff sensors comprises one or more mechanical switches.

6. The appliance of claim 1, wherein the one or more shutoff sensors are configured to disable all of the one or more input interfaces on the interface region when the object is detected between the grasping surface of the handle and the door.

7. The appliance of claim 1, wherein the one of the one or more shutoff sensors are configured to disable at least one of the one or more input interfaces on the interface region when the object is detected in contact with the grasping surface.

8. The appliance of claim 1, wherein the one of the one or more shutoff sensors are configured to disable at least one of the one or more input interfaces on the interface region when the object is detected in proximity to the grasping surface.

9. The appliance of claim 1, wherein the handle comprises:
a housing attached to the door;
a cover attached to the housing and comprising at least a portion of the interface region; and
a printed circuit board contained by the housing and the cover.

10. The appliance of claim 1, wherein the one or more shutoff sensors are mounted on the handle.

11. The appliance of claim 1, wherein the one or more shutoff sensors are mounted on the door.

12. The appliance of claim 1, wherein the one or more shutoff sensors are configured to disable the at least one of the one or more input interfaces when an object is detected adjacent a predetermined region of the grasping surface.

13. The appliance of claim 1, wherein the one or more shutoff sensors are configured to disable at least one of the one or more input interfaces when an object is detected adjacent any portion of the grasping surface.

14. The appliance of claim 1, wherein the door is movably mounted to the cabinet by a pivot, and the opening direction comprises an arcuate path centered on a rotation axis of the pivot.

15. The appliance of claim 1, wherein the door is movably mounted to the cabinet by one or more sliders, and the opening direction comprises a linear path parallel to a travel path of the one or more sliders.

16. The appliance of claim 1, wherein the handle is elongated in a longitudinal direction, and is connected to the door at longitudinal ends of the handle.

17. The appliance of claim 1, wherein the handle is formed by a pocket or groove in the door.

18. The appliance of claim 1, wherein the handle is formed by a portion of the door that extends beyond a perimeter of the cabinet.

19. The appliance of claim 9, wherein the printed circuit board has a first side facing the cover and a second side facing opposite the cover, and wherein at least one of the one or more input interfaces are mounted on the first side of the printed circuit board, and at least one of the one or more shutoff sensors are mounted on the second side of the printed circuit board.

20. The appliance of claim 19, wherein the one or more shutoff sensors are completely enclosed within the housing and cover.

21. The appliance of claim 19, wherein the handle further comprises a display trim located between the first side of the printed circuit board and the cover, the display trim comprising a plurality of openings, each opening configured to surround one or more input interfaces or output interfaces.

* * * * *